United States Patent [19]

Bühler et al.

[11] Patent Number: 4,769,449
[45] Date of Patent: Sep. 6, 1988

[54] RED MONO-AZO WATER-SOLUBLE DYE CONTAINING CYANO, AMIDE AND AMINO SUBSTITUENTS

[75] Inventors: Ulrich Bühler, Alzenau; Manfred Hähnke, Kelkheim; Michael Kunze, Hofheim-Marxheim; Albert Bode, Schwalbach, all of Fed. Rep. of Germany

[73] Assignee: Cassella Aktiengesellschaft, Frankfurt am Main, Fed. Rep. of Germany

[21] Appl. No.: 11,103

[22] Filed: Feb. 5, 1987

Related U.S. Application Data

[63] Continuation of Ser. No. 839,379, Mar. 14, 1986, abandoned.

[51] Int. Cl.$^4$ .................... C09B 29/01; C09B 29/08; C09B 67/22; D06P 1/18
[52] U.S. Cl. .................. 534/854; 534/565; 534/573; 534/581; 534/597; 534/887
[58] Field of Search ............. 534/573 M, 597, 854

[56] References Cited

U.S. PATENT DOCUMENTS

| | | | |
|---|---|---|---|
| 3,520,871 | 7/1970 | Zanella | 534/854 X |
| 3,962,209 | 6/1976 | Gotteschlich et al. | 534/854 X |
| 4,189,427 | 2/1980 | Komorowski | 534/854 X |
| 4,479,899 | 10/1984 | Hamprecht | 534/847 |

FOREIGN PATENT DOCUMENTS

| | | | |
|---|---|---|---|
| 60-44556 | 3/1985 | Japan | 534/854 |
| 2108141 | 5/1983 | United Kingdom | 534/573 |

*Primary Examiner*—Floyd D. Higel
*Attorney, Agent, or Firm*—Connolly and Hutz

[57] ABSTRACT

Azo dyes of the formula

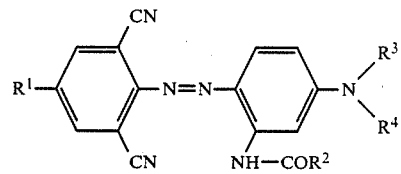

wherein $R^1$ is alkyl having 1 to 4 carbon atoms; $R^2$ is alkyl having 1 to 3 carbon atoms; $R^3$ is alkylcarbonyloxyethyl having 1 to 3 carbon atoms in the alkyl moiety, alkoxycarbonyloxyethyl having 1 to 4 carbon atoms in the alkoxy moiety, methoxyethoxycarbonyloxyethyl or ethoxyethoxycarbonyloxyethyl; and $R^4$ is one of the definitions of $R^3$ or cyanoethyl; or mixtures of at least two species of said formula are used for dyeing and printing hydrophobic fiber materials.

1 Claim, No Drawings

RED MONO-AZO WATER-SOLUBLE DYE CONTAINING CYANO, AMIDE AND AMINO SUBSTITUENTS

This is a continuation of application Ser. No. 839,379, filed Mar. 14, 1986, abandoned.

The present invention relates to useful new azo dyes which are free of ionic groups and have the general formula I

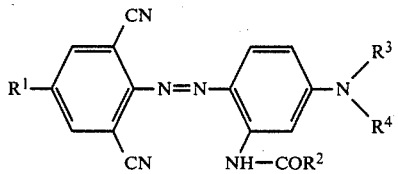

in which $R^1$ denotes alkyl having 1 to 4 C atoms, $R^2$ denotes alkyl having 1 to 3 C atoms, $R^3$ denotes alkylcarbonyloxyethyl having 1 to 3 C atoms in the alkyl group, alkoxycarbonyloxyethyl having 1 to 4 C atoms in the alkoxy group, methoxyethoxycarbonyloxyethyl or ethoxyethoxycarbonylethyl and $R^4$ has one of the meanings of $R^3$ and can in addition be cyanoethyl.

The invention also relates to mixtures of dyes of the general formula I, to the preparation of these dyes and their mixtures, and to their use for dyeing hydrophobic fibre materials.

Alkyl groups having 1 to 3 C atoms in the radicals $R^2$ and $R^3$ and alkyl groups having 1 to 4 C atoms in the radical $R^1$ can be linear or branched. Examples of such radicals are methyl, ethyl, n-propyl, i-propyl, n-butyl, i-butyl and sec.-butyl.

Alkoxy groups having 1 to 4 C atoms in the radical $R^3$ can likewise be straight-chain or branched and are for example methoxy, ethoxy, n-propoxy, i-propoxy, n-butoxy, i-butoxy and sec.-butoxy.

Preferred radicals for $R^1$ are methyl, ethyl and i-propyl, of which methyl is particularly preferred.

Preferred alkylcarbonyloxyethyl radicals for $R^3$ are methylcarbonyloxyethyl (=acetoxyethyl) and ethylcarbonyloxyethyl (=propoxyethyl).

Preferred combinations of $R^3$ and $R^4$ are those in which $R^3$ and $R^4$ are identical and those in which $R^4$ denotes cyanoethyl and $R^3$ denotes alkylcarbonyloxyethyl having 1 to 3 C atoms in the alkyl group or alkoxycarbonyloxyethyl having 1 to 4 C atoms in the alkoxy group.

Particularly preferred dyes are those with preferred combinations of $R^3$ and $R^4$ and the preferred meaning of $R^1$, in particular with the meaning methyl for $R^1$.

Dyes which are similar to the dyes according to the invention are already known and described in German Pat. No. 1,794,402. However, it has been found, surprisingly, that the dyes according to the invention are distinctly superior to these known dyes in dyeing properties on various substrates and in some important application and end-use fastness properties, such as pH sensitivity, fastness to heat-setting, wash fastness and light fastness. The dyes according to the invention are preferably prepared by subjecting an azo dye of the formula II

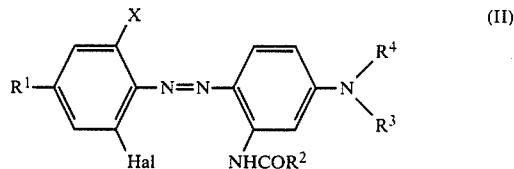

in which $R^1$, $R^2$, $R^3$ and $R^4$ have the abovementioned meanings, X denotes cyano or Hal, and Hal denotes a halogen atom such as chlorine or in particular bromine, in a conventional manner, for example in accordance with the instructions of German Offenlegungsschrift No. 1,809,920, German Offenlegungsschrift No. 1,809,921, corresp. to U.S. Pat. No. 3,845,034; British Pat. No. 1,184,825, German Auslegeschrift No. 1,544,563, corresp. to U.S. Pat. No. 4,237,048; German Offenlegungsschrift No. 2,310,745, corresp. to U.S. Pat. No. 3,978,040; German Auslegeschrift No. 2,456,495, corresp. to U.S. Pat. No. 4,045,430; German Auslegeschrift No. 2,610,675, corresp. to U.S. Pat. No. 4,348,319; German Offenlegungsschrift No. 2,724,116, corresp. to British Pat. No. 1,578,731; German Offenlegungsschrift No. 2,724,117, corresp. to British Pat. No. 1,578,732; German Offenlegungsschrift No. 2,834,137, corresp. to U.S. Pat. No. 4,192,800; German Offenlegungsschrift No. 2,341,109, corresp. to British Pat. No. 1,438,374; U.S. Pat. No. 3,821,195, German Offenlegungsschrift No. 2,715,034, corresp. to U.S. Pat. Nos. 4,126,610 and 4,165,297; or German Offenlegungsschrift No. 2,134,896, corresp. to U.S. Pat. No. 3,876,621; to a nucleophilic replacement reaction in which the nucleophilic agent used is the cyanide ion $CN^\ominus$. In this reaction, Hal (including where appropriate Hal standing for X) in the dye of the formula II is replaced by CN.

The solvents used in the replacement reaction are inert organic solvents, such as, for example, nitrobenzene or glycol or diglycol monomethyl or monoethyl ether or mixtures of such solvents with one another and with tertiary organic nitrogen bases, dipolar aprotic solvents, such as, for example, N-methylpyrrolidone, pyridine, dimethylformamide, dimethyl sulphoxide or dicyanodialkyl thioether. Other suitable media for the replacement reaction are water or aqueous systems consisting of water and a water-immiscible organic solvent, such as, for example, nitrobenzene, preferably in the presence of a wetting or dispersing agent or of a known phase transfer catalyst or consisting of water and a water-soluble inert organic solvent, such as ethylene glycol or dimethylformamide.

The replacement reaction is also favourably affected by the presence of organic basic nitrogen compounds, such as, for example, pyridine and pyridine bases.

The reaction temperatures for the replacement reaction are normally between 20° and 150° C.

The nucleophilic agent $CN^\ominus$ is added to the reaction in the form of a possibly complex metal cyanide, such as, for example, an alkali metal or alkaline earth metal cyanide, zinc cyanide, alkali metal cyano-zincate or -ferrate, but preferably in the form of copper(I) cyanide or of a copper(I) cyanide forming system. It is particularly advantageous to use a combination of alkali metal cyanide with copper(I) cyanide in which the weight ratio of alkali and copper salt can be varied within wide limits.

The normal range for the weight ratio alkali metal cyanide:copper(I) cyanide is 5:95 to 95:5. Even outside these limits it is still possible to observe the positive reciprocal influence of the components. It is of course also possible to replace the copper(I) cyanide in turn by a copper(I) cyanide forming system such as, for example, a combination of alkali metal cyanide with another copper salt, preferably copper(I) salt, such as, for example, a copper(I) halide.

The dyes of the formula II which are required for preparing the dyes according to the invention can be prepared by coupling a diazonium compound of an aromatic amine of the general formula III

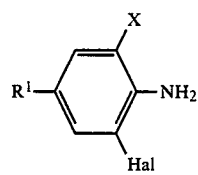
(III)

in a conventional manner with a coupling component of the general formula IV

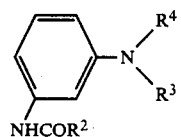
(IV)

in which X, Hal, $R^1$, $R^2$, $R^3$ and $R^4$ have the abovementioned meanings.

The amines of the general formula III are converted into the diazonium compounds in a conventional manner through the agency of nitrous acid or other systems forming nitrosonium ions in a mineral acid or a mineral acid aqueous medium, a lower alkanoic acid, such as, for example, formic acid, acetic acid or propionic acid or mixtures thereof, or an organic solvent at temperatures of $-15°$ C. to $40°$ C.

The coupling is likewise effected in a conventional manner by combining the resulting diazo solution with a solution of the coupling component at temperatures of $0°$ to $40°$ C., preferably $0°$ to $25°$ C., in a suitable solvent, such as, for example, an alkanol having 1 to 4 C atoms, dimethylformamide, preferably water which has been acidified with sulphuric acid, hydrochloric acid or phosphoric acid, or in an optionally water-containing lower alkanoic acid or a lower alkanoic acid mixture, in the presence or absence of a limitedly water-miscible alkanol. In some cases it can be advantageous to buffer the pH during the coupling, for example by addition of sodium acetate. The coupling is complete after some hours, and the dye of the formula II can, as usual, be isolated and dried.

The required coupling components of the formula IV can be prepared from known commercial products by known methods.

A further process for preparing the dyes according to the invention comprises diazotising an amine of the formula V

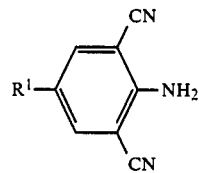
(V)

and coupling onto a coupling component of the formula IV

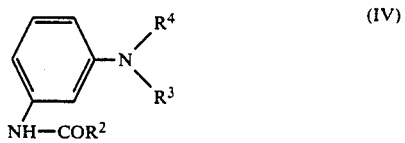
(IV)

where $R^1$, $R^2$, $R^3$ and $R^4$ have the abovementioned meanings.

The amines of the general formula V are converted into the diazonium compounds in a conventional manner through the agency of nitrous acid or other systems forming nitrosonium ions in a mineral acid or a mineral acid aqueous medium, a lower alkanoic acid such as, for example, formic acid, acetic acid or propionic acid or mixtures thereof, or an organic solvent at temperatures of $-20°$ to $20°$ C.

In this case too the coupling is effected in a conventional manner by combining the resulting diazo solution with a solution of the coupling component at temperatures of $0°$ to $40°$ C., preferably $0°$ to $25°$ C., in a suitable solvent, such as, for example, an alkanol having 1 to 4 C atoms, dimethylformamide, preferably water which has been acidified with sulphuric acid, hydrochloric acid or phosphoric acid, or in an optionally water-containing lower alkanoic acid or a lower alkanoic acid mixture, in the presence or absence of a limitedly water-miscible alkanol. In some cases it can be advantageous to buffer the pH during the coupling, for example by addition of sodium acetate. The coupling is complete after some hours, and the dye can, as usual, be isolated and dried.

Dye mixtures according to the invention consist of two or more dyes of the formula I in which $R^1$ to $R^4$ have the above-mentioned meanings. Preference is given to mixtures of dyes of the formula I in which all $R^1$ are methyl. Particular preference is given to mixtures of dyes which differ only in the meaning of the radicals $R^2$, in particular if in all individual dyes $R^1$ stands for methyl.

In the dye mixtures according to the invention the ratio of the various dyes of the general formula I can vary within relatively wide limits. In general, the minimum share by weight of a component is 10% and the maximum share by weight is 90%. In dye mixtures which consist of only two dyes of the general formula I, a weight ratio of 70:30 to 30:70 is preferred, that is to say the share by weight of a dye is 30 to 70%.

The dye mixtures according to the invention can be prepared by various methods. For one, by mixing of at least two individual dyes of the formula I, preferably in the presence of dispersants. This mixing is effected at temperatures of $0°$ to $190°$ C., advantageously in suitable mills, for example ball and sand mills, and in kneaders, but can also be effected by mixing by hand or by stirring into dispersion media or dyeing liquors.

The dispersants can be anionic or nonanionic. Suitable anionic dispersants are condensation products of naphthalene, formaldehyde and sulphuric acid and also ligninsulphonates. Suitable nonionic dispersants are for example described in German Offenlegungsschrift No. 2,757,330.

A further method for preparing the dye mixtures according to the invention comprises diazotising an amine of the formula V

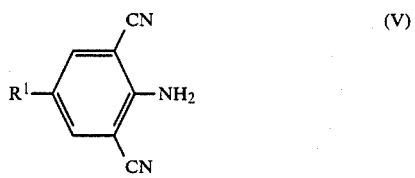

and coupling onto a mixture of at least two different coupling components of the formula IV

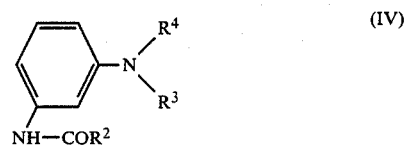

where $R^1$, $R^2$, $R^3$ and $R^4$ have the abovementioned meanings.

The composition of this mixture of coupling components is chosen to be such that the desired dye mixtures according to the invention are formed. The subsequent diazotisation and coupling are carried out in a conventional manner which is customary for preparing individual dyes.

If the object is to prepare mixtures of dyes of the formula I whose components differ in $R^1$, then it is not an individual amine of the formula V which is diazotised but a mixture of at least two amines of the formula V whose individual components differ in $R^1$, this mixture then being coupled onto a coupling component of the formula IV or a mixture of at least two different coupling components of the formula IV.

In a preferred further method, the new dye mixtures can be prepared by replacing in dye mixtures which consist of at least two dyes of the formula II halogen against cyano in a conventional manner, as previously described for example above for the individual dyes. The composition of this mixture of dyes of the formula II is chosen to be such that dye mixtures according to the invention are formed.

Particular preference is given to dye mixtures which, in the course of their preparation, have been heated to temperatures of at least 80° C., preferably 90° to 150° C., particularly preferably 100° to 140° C., and/or those dye mixtures which consist of mix-crystals or contain mix-crystals which are formed from two or more dyes of the formula I.

Dye mixtures which, in the course of their preparation, have been heated to the said temperatures of at least 80° C. can be prepared by heating the individual dyes in the absence or preferably in the presence of a dispersion medium, such as, for example, water, at the said temperatures for 0.5 to 3 hours, then cooling down, as a rule isolating and then mixing with one another. The heating can if desired also be carried out in the course of a recrystallisation of the individual dyes. The heating in water to temperatures above 100° C. is carried out in a sealed vessel. If the heating is carried out in a dispersion medium the addition of one or more of the dispersants mentioned hereinafter can be advantageous.

If a dye mixture consisting of two or more individual dyes is heated to the abovementioned temperatures, this as a rule produces mix-crystals which consist of two or more different dyes of the formula I.

Dye mixtures according to the invention which contain or consist of mix-crystals can also be prepared by dissolving a mixture of at least two separately prepared, different dyes of the formula I and inducing crystallisation or precipitation. Suitable for dissolving the dye mixture are for example organic solvents, such as dimethylformamide, dimethyl sulphoxide, chlorobenzene, o-dichlorobenzene, toluene and so on. It is also possible to use mixtures of different solvents. The dissolving is advantageously effected at the boiling point of the solvent or solvent mixture. On cooling down, the mix-crystals then crystallise out. Instead of by cooling down, the mix-crystals can also be brought down by the addition of a solvent in which the dye is less soluble.

Another, particularly preferred way of obtaining mix-crystals is to carry out the abovementioned exchange of halogen against cyano in a mixture consisting of dyes of the formula II at the abovementioned temperatures of at least 80° C.

The mix-crystals can also be preferably formed by heating a mixture of at least two separately prepared, different dyes of the formula I in a poor solvent or dispersion medium, where only partial to negligible solution takes place, thereby converting the mixture into mix-crystals. A particularly suitable solvent or rather dispersion medium for such a conversion of the dye mixtures into mix-crystals is water at temperatures of 80° to 190° C., in particular 90° to 150° C., preferably 100° to 140° C. It will be readily understood that the heating at temperatures which can no longer be obtained in an open vessel is carried out in an autoclave. The addition of one or more solubilisers is advantageous. Such a solubiliser is for example a wholly water-soluble solvent, such as, for example, ethanol, or a partially water-soluble organic solvent, such as, for example, n-butanol.

However, particular preference is given to converting the dye mixtures into mix-crystals by heating in water to the above-mentioned temperatures in the presence of one or more emulsifiers and/or dispersants.

Suitable dispersants are for example anionic or nonionic dispersants, which can also be used together. Anionic dispersants are for example condensation products of aromatic sulphonic acids and formaldehyde, in particular condensation products of alkylnaphthalenesulphonic acids and formaldehyde, condensation products of optionally substituted phenol with formaldehyde and sodium bisulphite, alkali metal salts of condensation products of optionally substituted phenol, naphthalenesulphonic or naphtholsulphonic acids, formaldehyde and sodium bisulphite, alkali metal salts of condensation products of optionally substituted phenolsulphonic acids, formaldehyde and urea and also alkali metal salts of ligninsulphonic acids, alkyl- or alkylaryl-sulphonates, and alkylaryl polyglycol ether sulphates. Nonionic dispersants or emulsifiers are for example the reaction products of alkylene oxides, such as, for example, ethylene oxide or propylene oxide with alkylatable compounds, such as, for example, fatty alcohols, fatty amines, fatty acids, phenols, alkylphenols, arylalkylphenols, arylalkylarylphenols and carboxamides, such as, for example, addition products of 5 to 10 ethylene oxide units on $C_8$–$C_{10}$-alkylphenols.

The conversion of the dye mixtures into mix-crystals by heating in water is generally complete after 0.5 to 10 hours, preferably 1 to 3 hours. The presence of mix-crystals can be demonstrated by X-ray counting tube diagrams.

The dyes and dye mixtures according to the invention are individually or mixed with other disperse dyes highly suitable for dyeing and printing hydrophobic synthetic materials. Possible hydrophobic synthetic materials are, for example: secondary cellulose acetate, cellulose triacetate, nylons and high-molecular polyesters. The dyes according to the invention are preferably used for dyeing and printing materials made of high-molecular polyesters, in particular those based on polyethylene glycol terephthalates or their mixtures with natural fibre materials, or materials made of cellulose triacetate.

The hydrophobic synthetic materials can be present in the form of sheetlike or threadlike structures and have been processed for example into yarns or woven or knitted textile materials. The fibre material mentioned is dyed with the dyes or dye mixtures according to the invention in a conventional manner, preferably from aqueous suspension, in the presence or absence of carriers, between 80° and about 110° C. by the exhaust method or by the HT method in a dyeing autoclave at 110° to 140° C., as well as by the so-called Thermofixing method wherein the textile material is padded with the dyeing liquor and is then fixed or stabilised at about 80° to 230° C. The materials mentioned can be printed in a conventional manner by incorporating the dyes or dye mixtures according to the invention in a print paste and treating the material printed therewith at temperatures between 80° and 230° C. with HT steam, high-pressure steam or dry heat in the presence or absence of a carrier to fix the dye. This method produces very strong red dyeings and prints having very good fastness properties, in particular very good light, heat-setting, thermomigration and washing fastness and low pH and reduction sensitivity.

The dyes or dye mixtures according to the invention are also suitable for dyeing the abovementioned hydrophobic materials from organic solvents using the known solvent dyeing methods and for mass coloration.

In the dyeing liquors and printing pastes used in the above applications, the dyes according to the invention which are present in the dye mixtures should be present in a highly disperse form.

The dyes can be brought into a highly disperse form in a conventional manner by suspending the dye as obtained in the manufacturing process together with dispersants in a liquid medium, preferably water, and subjecting the mixture to the agency of shearing forces, in the course of which the dye particles originally present are mechanically reduced in size to such an extent that an optimal specific surface area is obtained and the sedimentation of the dye is as low as possible. The particle sizes of the dyes are generally between 0.5 and 5 $\mu$m, preferably about 1 $\mu$m.

The dispersants which are present in the grinding process can be nonionic or anionic. Nonionic dispersants are for example reaction products of alkylene oxides, such as, for example, ethylene oxide or propylene oxide, with alkylatable compounds, such as, for example, fatty alcohols, fatty amines, fatty acids, phenols, alkylphenols and carboxamides. Anionic dispersants are for example ligninsulphonates, alkyl- or alkylaryl-sulphonates or alkylaryl polyglycol ether sulphates.

The dye preparations thus obtained should be pourable for most uses. Therefore the dye and dispersant content is limited in these cases. In general the dispersions are standardised to a dye content of up to 50% by weight and a dispersant content of up to about 25%. For economic reasons dye contents are usually not lower than 15% by weight.

The dispersions can also contain further auxiliaries, for example those which act as oxidising agents, such as, for example, sodium m-nitrobenzenesulphonate or fungicidal agents, such as, for example, sodium o-phenylphenolate and sodium pentachlorophenolate.

The dye dispersions thus obtained can be used very advantageously for making up print pastes and dye liquors. They offer particular advantages in for example the continuous processes, where the dye concentration in the dyeing liquors needs to be kept constant by continuous feed of dye into the running apparatus.

In some applications the use of powder formulations is preferred. These powders contain the dye or the dye mixture, dispersant and other auxiliaries, such as, for example, wetting, oxidising, preserving and dedusting agents.

A preferred way of preparing pulverulent dye preparations consists in stripping the liquid dye dispersions described above of liquid, for example by vacuum drying, freeze drying, drying on drum dryers, but preferably by spray drying.

To prepare the dyeing liquors, the required amounts of dye formulations which are prepared as described above are diluted with the dyeing medium, preferably with water, to such an extent that the result for the dyeing is a liquor ratio of 5:1 to 50:1. The liquors generally have added to them further dyeing auxiliaries, such as dispersing, wetting and fixing auxiliaries.

If the object is to use the dye or dye mixture for textile printing, the necessary amounts of the dye formulations are kneaded together with thickening agents, such as, for example, alkali metal alginates or the like and if desired further additives, such as, for example, fixation accelerants, wetting agents and oxidising agents, to give print pastes.

The invention is explained in more detail by the following examples. Percentages are by weight.

EXAMPLE 1

A suspension of 100 ml of dimethyl sulphoxide, 4.3 g of Sodium cyanide and 14 g of copper(I) cyanide has added to it at 70° to 75° C. 61.1 g of the dye of the formula VI

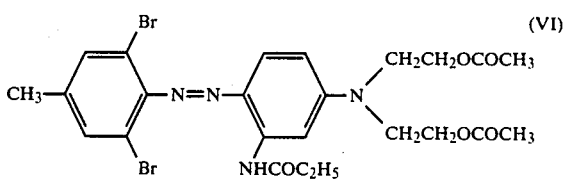

and is stirred at that temperature for 30 min. The temperature is then raised to 110° C. for 30 min and the batch is then slowly stirred until cold and is filtered with suction, and the filter cake is washed with 45 ml of dimethyl sulphoxide, 7.5% strength aqueous ammonia solution and water and is dried under reduced pressure. This gives 43 g of a bluish red dye of the formula VII

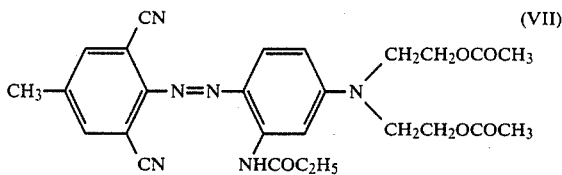  (VII)

which melts at 163° C. and has its absorption maximum at 520 nm.

By means of a commercially customary finishing process by aqueous grinding in a bead mill in the presence of a commercially customary dispersant based on ligninsulphonate and subsequent spray drying it is possible to obtain a ready-to-dye dye preparation.

(b) 1.2 g of the dye preparation thus obtained are dispersed in 2000 g of water. The dispersion is brought to pH 4–5 with acetic acid and has added to it 4 g of anhydrous sodium acetate and 2 g of a commercially available dispersant based on a naphthalenesulphonic acid/formaldehyde condensate. 100 g of a polyester fabric based on polyethylene glycol terephthalate are entered into the resulting dye liquor and are dyed at 130° C. for 30 min. Subsequent rinsing, reduction clearing with a 0.2% strength aqueous sodium dithionite solution at 70° to 80° C. for 50 min, rinsing and drying give a strong red dyeing having very good coloristic properties, in particular very good heat-setting, thermomigration and wash fastness.

EXAMPLE 2

If, as described in Example 1, 65.7 g of the dye of the formula VIII

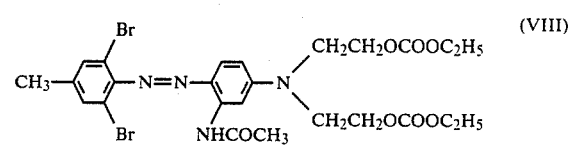  (VIII)

are subjected to a cyanide replacement by raising the temperature in the course of 30 min not to 110° C. but to 120° C. and filtering the dye off with suction at 40° to 50° C. and washing the filter cake with 100 ml of warm dimethyl sulphoxide at 40° C., this gives 45.6 g of a bluish red dye of the formula IX

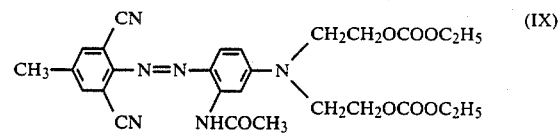  (IX)

which melts at 193° C. and has its absorption maximum at 516 nm.

By methods analogous to those of Examples 1 and 2 it is possible to prepare the dyes according to the invention of the following table. They likewise dye hydrophobic fibres in full red shades having excellent fastness properties.

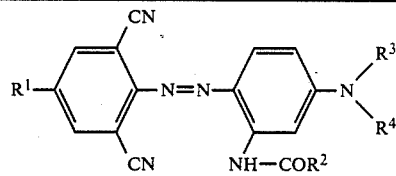  (I)

| R¹ | R² | R³ | R⁴ |
|---|---|---|---|
| CH₃ | CH₃ | (CH₂)₂OCOCH₃ | (CH₂)₂OCOCH₃ |
| CH₃ | i-C₃H₇ | (CH₂)₂OCOCH₃ | (CH₂)₂OCOCH₃ |
| CH₃ | n-C₃H₇ | (CH₂)₂OCOCH₃ | (CH₂)₂OCOCH₃ |
| CH₃ | CH₃ | (CH₂)₂OCOC₂H₅ | (CH₂)₂OCOC₂H₅ |
| CH₃ | C₂H₅ | (CH₂)₂OCOC₂H₅ | (CH₂)₂OCOC₂H₅ |
| CH₃ | n-C₃H₇ | (CH₂)₂OCOC₂H₅ | (CH₂)₂OCOC₂H₅ |
| CH₃ | CH₃ | (CH₂)₂OCOi-C₃H₇ | (CH₂)₂OCOi-C₃H₇ |
| CH₃ | CH₃ | (CH₂)₂OCOn-C₃H₇ | (CH₂)₂OCOn-C₃H₇ |
| CH₃ | CH₃ | (CH₂)₂OCOOCH₃ | (CH₂)₂OCOOCH₃ |
| CH₃ | C₂H₅ | (CH₂)₂OCOOCH₃ | (CH₂)₂OCOOCH₃ |
| CH₃ | i-C₃H₇ | (CH₂)₂OCOOCH₃ | (CH₂)₂OCOOCH₃ |
| CH₃ | n-C₃H₇ | (CH₂)₂OCOOCH₃ | (CH₂)₂OCOOCH₃ |
| CH₃ | C₂H₅ | (CH₂)₂OCOOC₂H₅ | (CH₂)₂OCOOC₂H₅ |
| CH₃ | n-C₃H₇ | (CH₂)₂OCOOC₂H₅ | (CH₂)₂OCOOC₂H₅ |
| CH₃ | CH₃ | (CH₂)₂OCOOn-C₃H₇ | (CH₂)₂OCOOn-C₃H₇ |
| CH₃ | C₂H₅ | (CH₂)₂OCOOn-C₃H₇ | (CH₂)₂OCOOn-C₃H₇ |
| CH₃ | CH₃ | (CH₂)₂OCOOi-C₃H₇ | (CH₂)₂OCOOi-C₃H₇ |
| CH₃ | C₂H₅ | (CH₂)₂OCOOi-C₃H₇ | (CH₂)₂OCOOi-C₃H₇ |
| CH₃ | CH₃ | (CH₂)₂OCOOn-C₄H₉ | (CH₂)₂OCOOn-C₄H₉ |
| CH₃ | C₂H₅ | (CH₂)₂OCOOi-C₄H₉ | (CH₂)₂OCOOi-C₄H₉ |
| CH₃ | CH₃ | (CH₂)₂OCOO(CH₂)₂OCH₃ | (CH₂)₂OCOO(CH₂)₂OCH₃ |
| CH₃ | C₂H₅ | (CH₂)₂OCOO(CH₂)₂OCH₃ | (CH₂)₂OCOO(CH₂)₂OCH₃ |
| CH₃ | CH₃ | (CH₂)₂OCOO(CH₂)₂OC₂H₅ | (CH₂)₂OCOO(CH₂)₂OC₂H₅ |
| CH₃ | C₂H₅ | (CH₂)₂OCOO(CH₂)₂OC₂H₅ | (CH₂)₂OCOO(CH₂)₂OC₂H₅ |
| CH₃ | CH₃ | (CH₂)₂OCOCH₃ | (CH₂)₂CN |
| CH₃ | C₂H₅ | (CH₂)₂OCOCH₃ | (CH₂)₂CN |
| CH₃ | n-C₃H₇ | (CH₂)₂OCOCH₃ | (CH₂)₂CN |
| CH₃ | CH₃ | (CH₂)₂OCOC₂H₅ | (CH₂)₂CN |
| CH₃ | C₂H₅ | (CH₂)₂OCOC₂H₅ | (CH₂)₂CN |
| CH₃ | i-C₃H₇ | (CH₂)₂OCOC₂H₅ | (CH₂)₂CN |

-continued

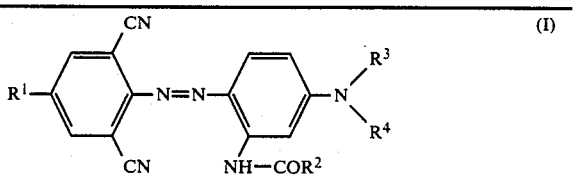
(I)

| R¹ | R² | R³ | R⁴ |
|---|---|---|---|
| $CH_3$ | $CH_3$ | $(CH_2)_2OCOOC_2H_5$ | $(CH_2)_2CN$ |
| $CH_3$ | $C_2H_5$ | $(CH_2)_2OCOOC_2H_5$ | $(CH_2)_2CN$ |
| $CH_3$ | $n-C_3H_7$ | $(CH_2)_2OCOOC_2H_5$ | $(CH_2)_2CN$ |
| $CH_3$ | $C_2H_5$ | $(CH_2)_2OCOOn-C_3H_7$ | $(CH_2)_2CN$ |
| $CH_3$ | $CH_3$ | $(CH_2)_2OCOOi-C_3H_7$ | $(CH_2)_2CN$ |
| $CH_3$ | $C_2H_5$ | $(CH_2)_2OCOOi-C_3H_7$ | $(CH_2)_2CN$ |
| $CH_3$ | $C_2H_5$ | $(CH_2)_2OCOO(CH_2)_2OCH_3$ | $(CH_2)_2CN$ |
| $C_2H_5$ | $CH_3$ | $(CH_2)_2OCOCH_3$ | $(CH_2)_2OCOCH_3$ |
| $C_2H_5$ | $C_2H_5$ | $(CH_2)_2OCOCH_3$ | $(CH_2)_2OCOCH_3$ |
| $C_2H_5$ | $n-C_3H_7$ | $(CH_2)_2OCOCH_3$ | $(CH_2)_2OCOCH_3$ |
| $C_2H_5$ | $CH_3$ | $(CH_2)_2OCOC_2H_5$ | $(CH_2)_2OCOC_2H_5$ |
| $C_2H_5$ | $CH_3$ | $(CH_2)_2OCOOC_2H_5$ | $(CH_2)_2OCOOC_2H_5$ |
| $C_2H_5$ | $C_2H_5$ | $(CH_2)_2OCOOC_2H_5$ | $(CH_2)_2OCOOC_2H_5$ |
| $C_2H_5$ | $CH_3$ | $(CH_2)_2OCOOi-C_3H_7$ | $(CH_2)_2OCOOi-C_3H_7$ |
| $C_2H_5$ | $CH_3$ | $(CH_2)_2OCOCH_3$ | $(CH_2)_2CN$ |
| $C_2H_5$ | $C_2H_5$ | $(CH_2)_2OCOCH_3$ | $(CH_2)_2CN$ |
| $n-C_3H_7$ | $CH_3$ | $(CH_2)_2OCOCH_3$ | $(CH_2)_2CN$ |
| $n-C_3H_7$ | $C_2H_5$ | $(CH_2)_2OCOCH_3$ | $(CH_2)_2CN$ |
| $n-C_3H_7$ | $CH_3$ | $(CH_2)_2OCOCH_3$ | $(CH_2)_2OCOCH_3$ |
| $i-C_3H_7$ | $CH_3$ | $(CH_2)_2OCOCH_3$ | $(CH_2)_2OCOCH_3$ |
| $i-C_3H_7$ | $C_2H_5$ | $(CH_2)_2OCOCH_3$ | $(CH_2)_2OCOCH_3$ |
| $i-C_3H_7$ | $CH_3$ | $(CH_2)_2OCOC_2H_5$ | $(CH_2)_2OCOC_2H_5$ |
| $i-C_3H_7$ | $C_2H_5$ | $(CH_2)_2OCOC_2H_5$ | $(CH_2)_2OCOC_2H_5$ |
| $i-C_3H_7$ | $n-C_3H_7$ | $(CH_2)_2OCOCH_3$ | $(CH_2)_2OCOCH_3$ |
| $i-C_3H_7$ | $CH_3$ | $(CH_2)_2OCOOC_2H_5$ | $(CH_2)_2OCOOC_2H_5$ |
| $i-C_3H_7$ | $C_2H_5$ | $(CH_2)_2OCOOi-C_3H_7$ | $(CH_2)_2OCOOi-C_3H_7$ |
| $i-C_3H_7$ | $CH_3$ | $(CH_2)_2OCOCH_3$ | $(CH_2)_2CN$ |
| $i-C_3H_7$ | $CH_3$ | $(CH_2)_2OCOC_2H_5$ | $(CH_2)_2CN$ |
| $i-C_3H_7$ | $C_2H_5$ | $(CH_2)_2OCOCH_3$ | $(CH_2)_2CN$ |
| $i-C_3H_7$ | $CH_3$ | $(CH_2)_2OCOOC_2H_5$ | $(CH_2)_2CN$ |
| $i-C_3H_7$ | $C_2H_5$ | $(CH_2)_2OCOOC_2H_5$ | $(CH_2)_2CN$ |
| $i-C_3H_7$ | $C_2H_5$ | $(CH_2)_2OCOOi-C_3H_7$ | $(CH_2)_2CN$ |
| $i-C_3H_7$ | $C_2H_5$ | $(CH_2)_2OCOO(CH_2)_2OCH_3$ | $(CH_2)_2CN$ |
| $n-C_4H_9$ | $CH_3$ | $(CH_2)_2OCOCH_3$ | $(CH_2)_2OCOCH_3$ |
| $n-C_4H_9$ | $C_2H_5$ | $(CH_2)_2OCOCH_3$ | $(CH_2)_2OCOCH_3$ |
| $i-C_4H_9$ | $C_2H_5$ | $(CH_2)_2OCOCH_3$ | $(CH_2)_2OCOCH_3$ |
| $i-C_4H_9$ | $C_2H_5$ | $(CH_2)_2OCOCH_3$ | $(CH_2)_2CN$ |
| $i-C_4H_9$ | $C_2H_5$ | $(CH_2)_2OCOOC_2H_5$ | $(CH_2)_2OCOOC_2H_5$ |
| $t-C_4H_9$ | $C_2H_5$ | $(CH_2)_2OCOCH_3$ | $(CH_2)_2OCOCH_3$ |
| $s-C_4H_9$ | $CH_3$ | $(CH_2)_2OCOCH_3$ | $(CH_2)_2OCOCH_3$ |
| $CH_3$ | $CH_3$ | $(CH_2)_2OCOOs-C_4H_9$ | $(CH_2)_2OCOOs-C_4H_9$ |

In the above table the meanings are:
n = normal
i = iso
s = secondary and
t = tertiary

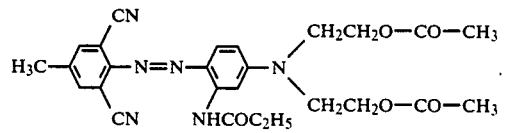

What is claimed is:
1. Azo dye free of ionic moieties having the formula

* * * * *